United States Patent [19]

Allan et al.

[11] Patent Number: 5,677,031
[45] Date of Patent: Oct. 14, 1997

[54] POROUS PTFE STRUCTURES

[75] Inventors: Andrew Miller Allan, Blairgowrie; Brian Andrew Barker, Craigig, both of Scotland

[73] Assignee: W. L. Gore & Associates, Inc., Newark, Del.

[21] Appl. No.: 432,902

[22] Filed: May 2, 1995

Related U.S. Application Data

[63] Continuation of Ser. No. 971,244, Nov. 4, 1992, abandoned, which is a continuation-in-part of Ser. No. 676,628, Mar. 28, 1991, abandoned.

[30] Foreign Application Priority Data

Mar. 31, 1990 [GB] United Kingdom ............... 9007304

[51] Int. Cl.$^6$ ....................... C08J 9/24; B32B 3/26
[52] U.S. Cl. ............ 428/137; 428/402; 428/323; 428/327; 428/308.4; 428/315.7; 428/317.9; 428/318.4; 428/304.4; 428/240; 428/245; 428/256; 428/283; 428/290; 428/463; 428/520; 428/522; 428/516; 428/332; 428/218; 428/215; 55/522; 55/524; 210/503; 210/506; 210/510.1; 521/145; 521/919
[58] Field of Search ............... 428/137, 402, 428/323, 327, 308.4, 315.7, 317.9, 318.4, 304.4, 240, 245, 256, 283, 290, 463, 520, 522, 516, 332, 218, 215; 55/522, 524; 210/503, 506, 510.1; 521/145, 919

[56] References Cited

U.S. PATENT DOCUMENTS

| | | | |
|---|---|---|---|
| 2,936,301 | 5/1960 | Thomas et al. | 428/402 |
| 3,087,921 | 4/1963 | Mathews et al. | 428/402 |
| 3,558,583 | 1/1971 | Alsup et al. | 526/255 |
| 3,968,297 | 7/1976 | Sauer | 428/422 |
| 3,981,852 | 9/1976 | Manwiller et al. | 526/250 |
| 3,986,851 | 10/1976 | Grodek | 55/488 |
| 4,766,188 | 8/1988 | Attwood et al. | 521/145 |
| 4,834,847 | 5/1989 | McIntyre | 204/263 |

FOREIGN PATENT DOCUMENTS

| | | |
|---|---|---|
| 0087149 | 2/1983 | European Pat. Off. . |
| 0172750 | 8/1985 | European Pat. Off. . |
| 0198620 | 3/1986 | European Pat. Off. . |
| 0369466 | 5/1990 | European Pat. Off. . |
| 1272579 | 8/1960 | France . |
| 2050778 | 6/1969 | France . |
| 2050778 | 3/1971 | France . |
| 1199972 | 9/1965 | Germany . |
| 405707 | 8/1961 | Switzerland . |
| 831326 | 11/1956 | United Kingdom . |
| 919261 | 2/1959 | United Kingdom . |
| 1252603 | 5/1969 | United Kingdom . |
| 1237839 | 6/1969 | United Kingdom . |
| 1300506 | 4/1971 | United Kingdom . |
| 1399213 | 6/1972 | United Kingdom . |
| 1475316 | 3/1974 | United Kingdom . |
| 1476272 | 2/1975 | United Kingdom . |
| 2051091 | 1/1981 | United Kingdom . |
| 2193214A | 5/1987 | United Kingdom . |
| 2242431 | 10/1991 | United Kingdom . |

OTHER PUBLICATIONS

Chemical Abstracts, vol. 92, 1980, p. 38, 92:95225p.

Primary Examiner—William Watkins
Attorney, Agent, or Firm—Gary A. Samuels, Esquire

[57] ABSTRACT

A porous polytetrafluoroethylene (PTFE) structure particularly for use as a liquid filter comprises particles of granular-type PTFE fused together to form a porous integral network. The structure is formed by spraying an aqueous suspension of granular PTFE particles and baking at a temperature of 335°–350° C. Typically the specific gravity is 0.8 to 1.54. The crystallinity is less than 95%. The structure may be supported on a perforate substrate such as stainless steel mesh.

5 Claims, No Drawings ered porous PTFE articles which have been formed from fine-powder type PTFE. However, the porosities are quite low, being typically about 18% voids at specific gravities of around 2.0. European patent specification EP0172750 relates to semisintered PTFE articles which are rendered porous by expanding the articles. Again, the disclosure is predominantly concerned with fine-powder type PTFE.
POROUS PTFE STRUCTURES This application is a continuation, of application Ser. No. 07/971,244 filed Nov. 4, 1992, abandoned which is a continuation-in-part of application Ser. No. 07/676,628, filed Mar. 28, 1991 abandoned.

FIELD OF THE INVENTION

The present invention relates to a porous polytetrafluoroethylene (PTFE) structure.

The main use envisaged for the structure is as a filter for industrial filtration, particularly for solid liquid, solid/gas and liquid/liquid separation. However, the structure may also find use in other applications where porous structures are required.

BACKGROUND OF THE INVENTION

The traditional method of producing filtration elements almost invariably relies on a two stage process, i.e. the manufacture of an element (usually of metal e.g. a wire mesh cage) which acts as a strength member and gives a shape or form onto which a filter cloth (i.e. the filter medium) or bag can be attached. The filter medium has traditionally been constructed from either specially woven metallic and non-metallic fabrics or needle punched felt and has generally been sewn together to form a construction which can then be attached to or slipped onto or over the element. The combined construction (generally with many such identical constructions) fits together inside a filter housing.

The filter device operates with the filter cloth acting as the filter medium and the element providing a support for the filter cloth during the filtration process. Most filter devices have built-in cleaning systems, but after a period the filter cloth normally has to be removed and either cleaned or replaced.

PTFE is a useful material for the construction of filters in view of its chemical inertness and ease of cleaning. Textile materials based on PTFE have been used in solid/gas and solid/liquid filtration applications. One example is removal of particulate material from furnace exhaust gases. However, the open pore structure of these PTFE textile materials does not give acceptable filtration performance in many filtration applications e.g. solid/liquid separation.

It is known to apply PTFE coatings to substrates to impart non-stick properties or chemical inertness. Patent specification GB 2051091 discloses sprayable coating compositions comprising mixtures of PTFE and other fluoropolymers which are intended to produce coatings free of cracks. Several coating layers may be applied to build up the desired thickness. However, the principal aim of the disclosure is to produce non-porous coatings which are crack-free.

European patent specification EP0087149 discloses sintered porous PTFE articles which have been formed from fine-powder type PTFE. However, the porosities are quite low, being typically about 18% voids at specific gravities of around 2.0. European patent specification EP0172750 relates to semisintered PTFE articles which are rendered porous by expanding the articles. Again, the disclosure is predominantly concerned with fine-powder type PTFE.

It is an object of the present invention to provide a porous structure based on PTFE which is robust enough for use in, for example, industrial filtration applications.

SUMMARY OF THE INVENTION

Broadly stated, the present invention provides a porous continuous medium comprising particles of granular-type polytetrafluoroethylene fused such as to form a porous integral network of interconnected particles.

Thus the present invention provides a porous polytetrafluoroethylene structure which comprises particles of granular-type polytetrafluoroethylene fused together such as to form a porous integral network of interconnected particles. Such unsupported PTFE structures may be used, for example, as battery separators.

A particular aspect of the invention provides a filter element which comprises;

a perforate strength member substrate;

a porous continuous coating medium covering the substrate, such that the substrate provides a mechanical support for the coating;

the coating comprising particles of granular polytetrafluoroethylene fused such as to form a porous integral network of interconnected particles.

The invention also extends to a corresponding method of producing the porous structure.

DESCRIPTION OF PREFERRED EMBODIMENTS

The material from which the perforate substrate is produced is of secondary importance, provided that it can be securely bonded to the porous coating and has a chemical inertness appropriate to the end use of the filter element. Suitable materials include metals, plastics and ceramics. The perforate substrate may be formed of a perforated, sintered or mesh material (including woven, non-woven, and knitted materials). The perforations preferably comprise at least 25%, more preferably at least 50% of the surface area of the substrate. Especially preferred substrates include stainless steel mesh, and woven and non-woven PTFE-based or polypropylene-based textile materials.

The perforate substrate is usually a sheet-like material but is not necessarily planar, and may take a variety of forms such as curved, convex, concave, tubular or irregular shaped. The substrate may be flexible or substantially rigid. The perforate substrate may itself be attached to a further support element, e.g. by spot welding.

The size of the perforations in the substrate is greater than the pore size of the continuous coating. Preferably the perforations have an average pore size greater than 100 microns, while the coating has an average pore size less than 15 microns.

The substrate may require to be toughened (e.g. by grit blasting) to provide a key for the coating.

The porous nature of the PTFE structure results from the particulate nature of the granular PTFE used to form it. The baking conditions are chosen such that the PTFE particles become partially fused or sintered into an integral porous network during baking. It is an important feature of the present invention that granular type PTFE is employed. As is well known, PTFE can exist in two quite different forms viz; the granular form produced by precipitation polymerization techniques, and the powdered form produced by dispersion polymerization processes. These two types of PTFE have quite different properties and have to be considered separately.

Unsintered granular PTFE generally has a crystallinity in excess of 95% as determined by differential scanning calorimetry or by infra-red techniques. The degree of crystallinity is reduced by sintering (i.e. baking), and the structure of the present invention will typically have a crystallinity of less than 95%, often less than 80%. The structure may be produced from granular PTFE particles which are either sintered or unsintered (or a mixture of both) prior to fusing together.

The particles themselves are preferably substantially pure granular PTFE, possibly including minor amounts of other materials, such as fillers. The average particle size is usually in the range 1–500, usually 1–200, particularly 1–100 microns. Depending on the desired porosity of the structure, the particles may have substantially the same particle size, or a range of varying particle sizes may be included which pack to influence the porosity of the structure. One preferred embodiment uses mixtures of particles of weight average particle sizes 20–50 and 30–60 microns. The granular PTFE may be milled or unmilled.

The porosity may be determined as a function of the density of the PTFE structure. The structure of the present invention generally has a specific gravity of 0.8 to 1.8, usually 1.00 to 1.54. In comparison, pure non-porous PTFE typically has a specific gravity of 2.16.

The structure is generally formed by spraying a suspension comprising particles of granular PTFE, allowing to dry and baking at a temperature usually in the range 335°–350° C. for 0.5 to 3 hrs. Generally, the process is conducted at substantially atmospheric pressure. Spraying ensures that no air pockets are left between the substrate and the coating which might lead to delamination of the coating. The suspension is usually an aqueous suspension comprising appropriate surfactants, thickening agents and/or suspending agents. The temperature may be progressively raised over a few hours e.g. 1 to 10 hours in order to remove such additives, prior to baking. If desired, the there may also be included fillers such as active carbon, glass, chromium oxide or titanium oxide. In particular the inclusion of active carbon may be used to increase the porosity (and reduce the specific gravity) of the structure.

Spraying is usually more suitable for particles of lower particle size, for example 1–200 microns. Higher particle sizes may be applied by other liquid coating techniques.

The thickness of the structure will vary depending on the required permeability and physical strength, but is usually in the region 25–4000 microns, particularly 125–2500 microns, and preferably 50–1,000 microns.

A porous PTFE coating may simply overlie the substrate (e.g. in the case of a sintered substrate), or the substrate may be embedded in the coating (e.g. when a mesh substrate is used).

A filter element according to the present invention has the advantages of being chemically inert, so that it does not react and may be cleaned in-situ by dissolving the contaminant with, for example, acids, alkalis, redox agents or organic solvents. The filter element may also be cleaned by back flushing at pressures and flow rates higher than possible with traditional filter media. Due to the non-stick characteristics of the fluorocarbon filter element, the element has good release properties permitting ready removal of filtered material. The filter is also less susceptible to blockage than conventional filters so that there is a reduced need for the application of any precoat or filter aid. The thermal stability of PTFE also allows the filter to be used for high temperature liquid and gas filtration (usually up to about 260° C.) as well as in cryogenic applications. Finally, the filter element may be made in a variety of shapes to suit the particular application, by first forming the substrate in the required shape and subsequently applying the coating.

The filter element may be of a unitary construction in contrast to certain prior art filters which employ a separate filter and support structure.

Thus, the filter element is suitable for use inter alia in filter presses, candle/leaf filters, rotary vacuum filters, air slides, bag house filters, oil-water separators, and tubular dewatering filters.

Particular applications include tubular filters for cake filtration and backwash cleaning which have the coating medium on the outside; optionally using a precoat, backpulse filtration and/or gas blowing to dry the cake before removal. Filter leaves may be used instead of tubes. The invention may be used in various filter constructions including rotary drum or disc vacuum or pressure filters, Nutsche filters, filterpresses, filter thickeners, artesian filters, shriver thickeners, filtering centrifuges and cross-flow filters. The invention may also be applied to flat, cylindrical or other shaped underdrains in sand filters; optionally containing adsorptive materials. The filter may be used in catalytic reactors to filter catalyst from product stream, in a wide variety of industrial processes.

Embodiments of the present invention will now be described by way of example only.

EXAMPLE 1

Preparation of unsintered granular PTFE suspension.

500 grams of DuPont granular PTFE grade 9B which had been milled to a weight average particle size of about 40 microns (2–100 microns size range), 13 ml of Zonyl FSN 100 surfactant (a non-ionic perfluoroalkyl ethoxylate mixture), 41 ml of Pluronic L121 surfactant (a polyoxyethylene/polyoxypropylene block copolymer), 114 ml of a 1% sodium carboxy-methyl-cellulose solution in water (thickening agent) weight-for-weight solids were added to 343 grains of water and blended in a Waring blender for 5 minutres.

Formation of porous granular PTFE structure.

The above suspension was sprayed onto a ceramic tile to a nominal wet film thickness of 1000 microns using a Binks BBR spray gun and L88 pressure cup, then dried in an oven at 65° C. for 1 hour. The temperature was then progressively increased over a few hours up to 350° C. and held for 45 minutes. The resultant film was then cooled and peeled from the ceramic tile. After testing it was found that it exhibited exhibited a high air permeability.

The same procedure as outlined above was repeated using DuPont granular PTFE grade 7A in place of the granular PTFE grade 9B. The resultant film exhibited a much lower air permeability. The 100% PTFE 9B and 100% PTFE 7A structures exhibited the following characteristics.

TABLE 1

| Sample | Film Thickness (microns) | Water Flux* l/m² hr | Air Permeability Gurley **No. (seconds) | Water Entry Pressure (lbs/in²) | Specific Gravity (g/cc) |
| --- | --- | --- | --- | --- | --- |
| 100% PTFE 9B | 600 | 297,000 | 1.5 | 2.2 | 1.04 |
| 100% PTFE 7A | 600 | 3,700 | 27.0 | 6.5 | 1.52 |

*water flux achieved using a single stage vacuum pump rated at $1 \times 10^{-1}$ m bar along with standard Buchner Funnel Apparatus.
**Gurley No - Time (seconds) for 100 cc air to pass through 1 in² of filter medium at 4.88 inches $H_2O$ pressure differential, as determined using a Gurley 4110 Densometer according to the standard protocol.

Water entry pressure is determined by placing a sample of the film on the underside of a sheet of perspex 10 mm thick having a 2 mm diameter hole therein, with air above the film and water beneath. The water is pressurised until water starts to fill the bottom of the hole. This is the water entry pressure.

The specific gravity is determined by weighing a measured area of film of known thickness.

TEFLON (trademark) granular-type PTFE fluorocarbon resin grades 7A and 9B are available from DuPont Speciality Polymers Division, Wilmington U.S.A. Grade 9B is a premelted sintered resin. The product specification indicates an average specific gravity of 2.16, and an average particle size of 35 microns (grade 7A) and 500 microns (grade 9B prior to milling).

Prior to use, the PTFE grade 9B was milled by grinding an aqueous slurry thereof between grinding stones at room temperature using an arrangement as described in U.S. Pat. No. 4,841,623. The particle size of the milled PTFE was determined by dispersion in isopropyl alcohol using an ultrasonic device and a surfactant, followed by measurement using a Leeds and Northrup Microtrac II (model 7998) particle size analyser. PTFE grade 7A was unsintered and was used as supplied.

EXAMPLE 2

(various compositions)

To produce a range of porous structures unsintered granular PTFE suspensions were made up by repeating the procedures of Example 1 with varying percentages weight for weight of PTFE grade 9B and PTFE grade 7A. The characteristics of typical resultant porous structures are tabulated as follows.

TABLE 2

| Sample | | Thickness | Water flux* | Permeability Gurley No.** | Water Entry Pressure | Specific Gravity |
| --- | --- | --- | --- | --- | --- | --- |
| 9B | 7A | (microns) | l/m² hr | (seconds) | (lbs/in²) | (g/cc) |
| 95% | 5% | 600 | 286,000 | 1.5 | 2.6 | 1.09 |
| 85% | 15% | 560 | 245,000 | 3.0 | 2.7 | 1.12 |
| 80% | 20% | 550 | 245,000 | 3.6 | 2.8 | 1.15 |
| 65% | 35% | 600 | 177,000 | 5.0 | 3.2 | 1.23 |
| 55% | 45% | 730 | 138,000 | 9.6 | 3.7 | 1.28 |
| 25% | 75% | 760 | 26,000 | 11.0 | 5.0 | 1.40 |

Also, a structure of particularly high porosity was obtained from a mixture of 86% grade 7A together with 14% by weight of active carbon (Chemviron grade 114A). The specific gravity of the final structure was 1.14.

EXAMPLE 3

(coated mesh)

A sheet of woven stainless steel mesh (wire diameter 0.375 mm with 20 wires/inch warp and weft) was spot welded to a square mild steel frame. The procedure of Example 1 was repeated to make a coating composition containing 100% PTFE grade 9B (resin content). The coating composition was sprayed onto both sides of the stainless steel mesh. The coating was then air dried at 65° C. in an oven for 30 minutes. The temperature was then raised to 350° C. and held at this temperature for 45 minutes. The coating thickness after baking was nominally 850 microns. If required, in order to increase the coating thickness, further applications of coating composition could be sprayed and baked in analogous manner.

The filter element so produced was found to have good mechanical strength and high porosity.

EXAMPLE 4

(filter performance).

The procedure of Example 1 was repeated using a coating composition containing 50% PTFE grade 9B and 50% PTFE grade 7A by weight (resin content).

The resulting material was evaluated as a septum to determine performance criteria versus conventional filter cloth. The objective was to determine precoat bleed-through characteristics of a filter cake formed on a suction leaf test filter after aeration. This test simulates the mode of operation of a rotary vacuum filter when the filter cloth rotates out of the liquid bath, into free space (air) and then back into the liquid bath. Excessive precoat bleed-through in some applications is often undesirable.

The test apparatus comprised a flask connected to a vacuum source and equipped with a vacuum guage, and also connected via a tube to a suction leaf immersed in the water to be filtered. The test apparatus had a hydraulic capacity of 18 seconds litre (time taken to pass 1 litre of de-ionized water through the suction leaf with no filter medium attached).

A slurry comprising 5.5 g of precoat material/liter of de-ionized water was made up. The precoat employed was Celite 577 (Manville Corporation).

The clarity (turbidity, expressed in Jackson Turbidity Units JTU) was measured prior to aeration and then again after aeration and dipping of the vacuum leaf back into the precoat slurry.

Two conventional filter cloths viz. Eimco POPR 873 (25–35 Frazier Number) and Eimco NY 518F (1 Frazier Number) were tested along with the 50% 9B/50% 7A coating composition. The test yielded the following results.

TABLE 3

| | Time to filter one liter of water from precoat slurry (seconds) | Clarity JTU after filtering one liter of water before aeration. | Clarity JTU after aeration and filtering 700 ml of water |
| --- | --- | --- | --- |
| POPR 873 Eimco cloth | 52 | 95 | 200 |
| NY518F Eimco cloth | 49 | 30 | 70 |
| PTPE porous structure 50% 9B/50% 7A | 47 | 9 | 17.7 |

The results show that the porous PTFE structure exhibited superior (lower) bleed-through characteristics to conventional filtration fabrics.

EXAMPLE 5

250 gm of milled Du Pont granular PTFE grade 9B and 250 gm of milled Du Pont granular PTFE 7A was added to 343 gm water and blended in a Waring Blender along with 13 ml Zonyl FSN 100 surfactant 41 ml Pluronic L121 surfactant 57 ml of 1% sodium carboxymethyl-cellulose in water.

The resulting suspension was sprayed onto a stainless steel sheet to a nominal wet thickness of 10 mil using a Binks BBR spray gun and L88 pressure cup, then dried in an oven at 65° C. for 30 min. Then the temperature was raised to 350° C. and held there for 45 min. to bake the coating.

The resulting film was cooled and then peeled from the steel sheet.

The film was then laminated to a felt backing. The felt backing used were nonwoven materials made of polyester, polyamide, polypropylene and Nomex\polyamide. Lamination was carried out by simple fusion bonding, except when the Nomex nonwoven was laminated an FEP-adhesive was used.

The resulting laminated products had air permeabilities 0.5 to 2 Frazier number.

We claim:

1. A porous fused polytetrafluoroethylene structure which consists essentially of a porous sheet of particles of granular-type polytetrafluoroethylene, said particles having an average particle size between 1 and 500 microns, said particles fused together in a manner which forms a fused network of interconnected particles having pores between the particles, and in which the particles are packed in a manner which results in a specific gravity of the sheet of between 0.8 and 1.54.

2. The structure of claim 1 wherein the particles are composed of a mixture of a) particles of unsintered polytetrafluoroethylene of average particle size of 20–50 microns and b) particles of sintered polytetrafluoroethylene of average size of 30–60 microns.

3. A filter element for separation of solids from a fluid stream which consists essentially of:

(a) a perforate strength member substrate;

(b) a porous coating covering the substrate which consists essentially of a porous sheet of particles of granular-type polytetrafluoroethylene that are fused together in a manner which forms a fused network of interconnected particles having pores between the particles, said particles having an average particle size between 1 and 500 microns, and in which the particles are packed in a manner which results in a specific gravity of the sheet of between 0.8 and 1.54.

4. The filter element of claim 3 wherein the particles of granular-type polytetrafluoroethylene are composed of a mixture of a) particles of unsintered tetrafluoroethylene of average size of 20–50 microns and b) particles of sintered polytetrafluoroethylene of average size of 30–60 microns.

5. The filter element of claim 4 wherein the perforate strength member substrate is selected from the class consisting of metal mesh, a porous sintered metal, a woven PTFE-based textile material, a woven polypropylene-based textile material, a non-woven PTFE-based textile material, and a non-woven polypropylene-based textile material.

* * * * *